Feb. 20, 1945.   F. GOSSLAU   2,369,665
CHARGE FORMER
Original Filed Oct. 7, 1938

Inventors
F. Gosslau
J. Schmidt   G. Veiche
E. a. Van.

By

Agent

Patented Feb. 20, 1945

2,369,665

UNITED STATES PATENT OFFICE 2,369,665

CHARGE FORMER

Fritz Gosslau, Berlin-Charlottenburg, Johannes Schmidt, Berlin-Eichkamp, and Georg Weiche, Berlin-Reinickendorf, Germany; vested in the Alien Property Custodian Original application October 7, 1938, Serial No. 233,728. Divided and this application May 20, 1941, Serial No. 394,322. In Germany October 8, 1937

5 Claims. (Cl. 261—28)

The present invention relates to internal combustion engines, and more particularly to devices for regulating internal combustion engines.

This application is a divisional application based upon certain subject matter contained in our prior copending application Serial No. 233,728, filed October 7, 1938, patented September 29, 1942, Serial No. 2,297,213.

Broadly, it is an object of the invention to provide regulating devices which are adapted to control the fuel supply of internal combustion engines.

More specifically, it is an object of the invention to provide regulating devices which are adapted to automatically keep constant the weight of the air in relation to the weight of the fuel.

It is still a further object of the invention to balance by means of a balance beam the difference of the static and the dynamic pressure of the air passing through the air intake on the one hand, and of the pressure prevailing inside and outside of the fuel injecting nozzle on the other hand, and to thereby control the fuel supply of internal combustion engines.

It is another object of the invention to control the fuel supply of internal combustion engines by balancing by means of a spring the difference of the static and the dynamic pressure of the air in the air intake, and by further balancing by means of a second spring the difference of the pressure inside and outside of the fuel injecting nozzle.

It is still another object of the invention to provide a regulator for controlling the fuel supply, said regulator being dependent upon the difference of the static and the dynamic air pressure in the air intake, and further upon the state of the air or its specific weight in such a manner that the regulator depends upon the ratio of the effective air pressure and of the specific volume of the air.

It is still another object of the invention to provide a device which allows a particularly favorable utilization of the fuel reserve of the engine. Our novel regulating device has, for instance, the advantage that aircraft provided with such regulators have a range of flight which is greater than with the use of the hitherto known regulating devices.

It is still a further object of the invention to provide a regulating device which under all service conditions operates free of objection and also, as is required, e. g., in the aircraft arts, in a very great height above the earth.

It is still another object of the invention to provide a device which practically never requires operation of the person controlling the engine, for instance of a pilot.

It is still another object of the invention to provide a regulating device which automatically adjusts definite mixture ratios of air and fuel particularly when using various kinds of fuel.

The novel regulator forming an object of the invention is, e. g., so constructed that the measuring device influenced by the pressure differences of the air drawn in in the air intake acts upon the spring load of the overflow valve of a pressure pump which feeds the fuel by way of nozzles into the charging pipe.

In accordance with a modification of this construction, the adjusting members of the device for measuring the quantity of air also may be used to alter the internal cross section of the fuel nozzle.

In order to measure the difference of the static and of the dynamic pressure of the air in the air intake Venturi nozzles or throats may advantageously be inserted into the air intake. Instead of the Venturi throat any other known measuring instrument may be used. However, Venturi nozzles have the advantage that practically no throttle losses occur.

These and other objects of the present invention will become more evident in the following description taken in connection with the drawing, in which.

An example of our novel regulating device shown herein is particularly characterized by its great simplicity and by the fact that it automatically sets the desired mixing ratio independent of the state of the air at each instant.

To this end the invention utilizes the knowledge that with invariable density of air and with a definite mixing ratio the pressure differential of the venturi bears a certain relation to the pressure difference prevailing in and behind the fuel nozzle. This knowledge is utilized by providing a pressure scale or balance beam influencing the fuel control valve. The balance beam provided in connection with the fuel mixture regulator is subjected, on the one hand, to the action of the pressure differential across the venturi and, on the other hand, to the pressure difference prevailing at the fuel spray nozzles.

A further feature of the invention consists in the use of a control slide relieved of the fuel pump pressure, the control slide being independent of the number of revolutions of the fuel pump or, as the case may be, independent of the characteristic of a spring, i. e., of the spring constant.

Figure 1:
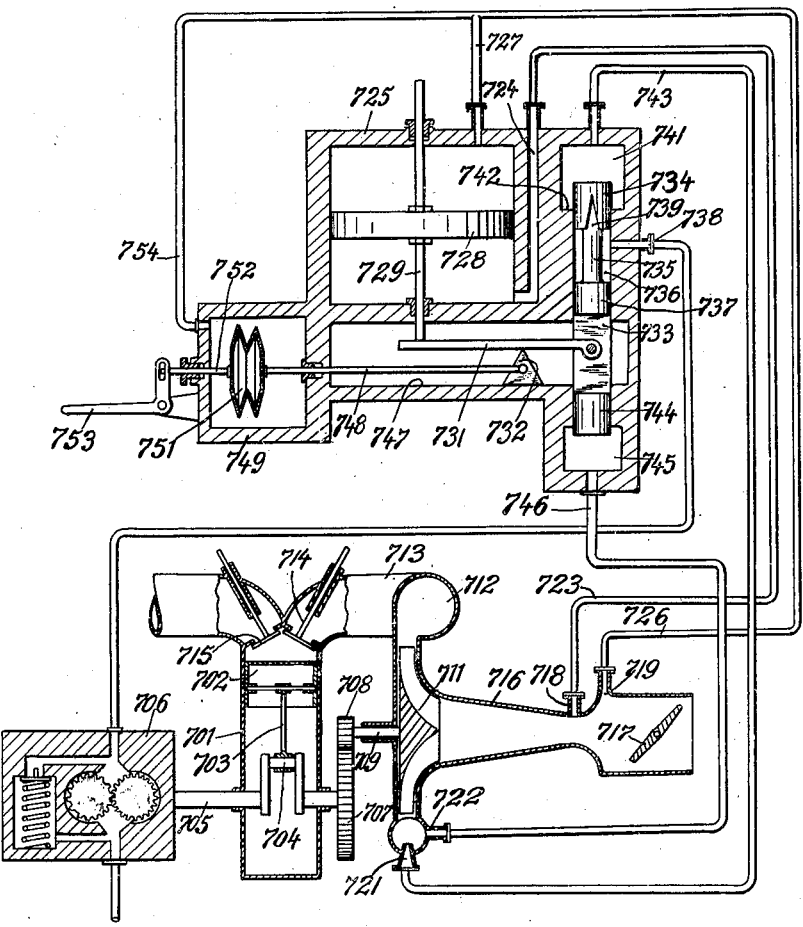
Fig. 1 is a diagrammatic representation of a regulator wherein the pressure difference prevailing at the fuel nozzle is utilized for effecting the control.

In Fig. 1 a single cylinder engine is shown for the sake of simplicity. Piston 702 is arranged in cylinder 701 and is connected by means of piston rod 703 to crank pin 704 of crankshaft 705. Fuel pump 706 is connected to one end of crankshaft 705. Fuel pump 706 is formed in a known manner as a geared pump and therefore a detailed showing and a description thereof is deemed unnecessary. Gear wheel 707 is mounted upon the other end of crankshaft 705 and cooperates with gear wheel 708 fixed upon shaft 709 of rotor 711 of the air blower. Spiral blower casing 712 is connected to pipe 713 leading to inlet valve 714. The exhaust valve is shown at 715. The suction space of the blower is formed as a Venturi tube 716. Throttle valve 717 is arranged in front of Venturi tube 716. Pipe connection 718 is provided at the point of Venturi tube 716 where the highest air velocity prevails. The air pressure, i. e., the effective pressure, prevailing at connection 718 indicates the quantity of air flowing through tube 716 in a unit of time. In front of point 718 a further pipe connection 719 is provided at the point, where stowage of the drawn in air begins.

Fuel injecting nozzle 721 is provided in the walls of blower casing 712 and behind nozzle 721 a pipe connection 722 is provided for indicating the air pressure prevailing in blower casing 712 behind fuel nozzle 721.

Pipe 723 leads from the connection 718 of the Venturi tube to channel 724 provided in regulator casing 725. Pipe 726 leads from pipe connections 719 of the Venturi tube by way of pipe 727 into regulator casing 725. A cylindrical space is provided in casing 725 wherein piston 728 may freely move up and down. Pipe 727 transmitting the pressure in front of the venturi discharges into the space above piston 728, and channel 724 carrying the pressure across the venturi discharges into the space below piston 728. Piston rod 729 bears against a balance beam 731 which may oscillate about prism 732. The other end of balance beam 731 is connected to slide 733 provided in a cylindrical recess of casing 725. Slide 733 is provided below its cylindrical head portion 734 with a portion 735 of reduced cross section so that an annular space 736 is formed in the cylinder space of casing 725. Below annular space 736 slide 733 enlarges again to form cylinder 737 of a cross section corresponding to that of slide head portion 734.

Pipe 738 branching from fuel pump 708 discharges into annular space 736. Head portion 734 of piston slide 735 carries a lateral groove 739 which in plan view has the form of a triangle. Groove 739 allows the fuel flowing from pipe 738 into space 736 to flow by way of triangular groove 739 into space 741 above slide 733. According to the height of slide 736 with regard to the bottom edge 742 of space 741 more or less fuel may flow into space 741. Pipe 743 leads from space 741 to fuel nozzle 721. The lower end 744 of piston slide 733 also is of cylindrical shape so that it restricts space 745 below slide 733. Pipe 746 leading from connection 722 in blower casing 712 discharges into space 745.

Pivot 732 around which balance beam 731 may be swung is formed as a prism which may easily be shifted upon surface 747. For this purpose rod 748 is provided which leads into a special fluid-tight casing 749. Rod 748 is connected in casing 749 with a barometric bellows 751. On the other hand, bellows 751 is maintained in its position by rod 752 linked to hand lever 753 which may be fixed in its position. Pipe 754 which, by way of pipe 726, is connected to tapping 719 discharges into casing 749.

The above described device operates as follows:
Supposing, e. g., the number of revolutions of the engine increases, while the position of throttle valve 717 remains invariable. Due to the increasing number of revolutions more air is drawn in by Venturi tube 716. Therefore, the pressure prevailing at connection 719 will be higher than that prevailing at connection 718. Consequently, the upper surface of piston 728 is now heavier loaded than its lower surface so that the piston starts to fall. Hence, lever 731 is swung in such a manner that control piston 733 is displaced upwardly. More fuel may now flow from space 736 by way of triangular groove 739 into space 741. The fuel flows into space 741 until the higher pressure built up in space 741 is in equilibrium with piston 728.

Simultaneously with the described operations, the pressure ratios prevailing at the fuel nozzle 721 and at the connection 722 of the blower casing also change. The higher number of revolutions of blower rotor 711 causes an increase of the pressure at connection 722 which is transmitted by way of pipe 746 into space 745. The increasing pressure in space 745 acts in the same manner as the increasing pressure above piston 728.

With decreasing output or efficiency of the engine, the described operations are performed in the reversed direction, and it is obvious that any change of the operating condition of the engine, which may be caused for instance by adjusting the throttle valve 717, also influences the balance beam consisting of the parts 728, 731 and 733.

The above described operation allows a regulation of the correct fuel mixture ratio only as long as the density of the air does not change. If the specific volume of the air changes, for instance due to a change of temperature, or due to the fact that the aircraft overcomes great differences in height, then these altered conditions must be considered. For this purpose bellows 751 is provided which is arranged in casing 749. From connection 719 in front of the Venturi tube the specific volume of the air indicating the state of the air prevailing in front of the Venturi tube is transmitted to casing 749 by way of pipes 726 and 754. Alterations of the state of the air effect an expansion or contraction of bellows 751 which, by means or rod 748, displaces prism 732 mounted upon surface 747 to the right or to the left, as the case may be. By the displacement of prism 732 the leverage of the regulator balance beam is altered in accordance with the change of the state of the air.

By this arrangement, therefore, a uniform mixing ratio of air and fuel independent upon the output of the engine and the prevailing barometric pressure is always assured.

Now, as is well known, a change of the fuel mixing ratio is desired with a change of the output of the internal combustion engine. This change of the fuel mixture ratio also can be obtained with a device according to the invention, and for this purpose lever 753 is provided. By adjusting lever 753 pivot point 732 of the balance beam is displaced and thereby the fuel mixing ratio is altered.

Figure 2:
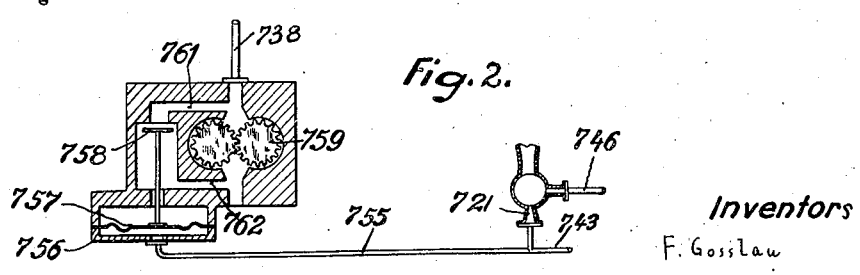
Fig. 2 is a view of a modification of a detail of the device shown generally in Fig. 3.

In Fig. 2 a device is shown which serves to improve the regulation. Pipe 755 leads from nozzle 721 into casing 756 below diaphragm 757. Casing 756 forms part of fuel pump 706. Valve 758 is connected to diaphragm 757. If valve 758 is opened, the fuel fed by geared wheels 759 flows no longer by way of pipe 738 into space 736, but by way of channels 761, 762 back to the other side of geared wheels 759. If the pressure prevailing in nozzle 721 increases, valve 758 is throttled and the feed pressure of the pump is increased.

Although preferred embodiments of the regulating device have been disclosed in accordance with the present invention, it is to be understood that variations and modifications therein may be made coming within the broader spirit and scope thereof as defined in the following claims.

What we claim is:

1. In an internal combustion engine, a blower, an air intake for transmitting air to said blower and comprising a venturi, a fuel injecting nozzle in said blower, an opening in said blower adjacent said fuel nozzle for determining the pressure in said blower, a fuel conduit connected to said fuel nozzle, a fuel pump feeding fuel through said conduit to said fuel nozzle, a first piston actuated by the difference of the air pressure across said venturi in said air intake, a cylinder, a second piston slidable in said cylinder having an upper head part a lower head part and a middle portion of reduced diameter arranged between said two head parts, said upper head part being connected with said fuel conduit and actuated by the pressure prevailing in said fuel nozzle, said lower head part being actuated by the pressure prevailing in the opening in said blower, said reduced middle portion being connected with and exposed to the pressure produced by said fuel pump, whereby said second piston is dependent upon the pressure difference between said fuel nozzle and said opening and independent upon said fuel pump pressure, a recess in said upper head part for transmitting the fuel from said fuel pump to said nozzle and controlling the amount of fuel fed to said fuel nozzle in accordance with the position of said upper head part, a balance beam provided with two arms, a fulcrum for supporting said balance beam, each of said arms being connected with one of said two pistons, whereby the amount of fuel fed to said nozzle is controlled in dependence upon said air pressure difference and upon the difference of the pressure inside and outside of said fuel nozzle.

2. In an internal combustion engine, a blower, an air intake connected with said blower and having a venturi, a fuel injecting nozzle in said blower, an opening in said blower adjacent said fuel nozzle for determining the pressure in said blower, a fuel conduit connected with said fuel nozzle, a fuel pump feeding fuel through said conduit to said fuel nozzle, a first piston actuated by the difference of the air pressure across said venturi in said air intake, a cylinder, a second piston slidable in said cylinder and having an upper head part a lower head part and a middle portion of reduced diameter arranged between said two head parts, said upper head part being connected with said fuel conduit and actuated by the pressure prevailing in said fuel nozzle, said lower head part being exposed to the pressure prevailing in said opening, said reduced middle portion being connected with and exposed to the pressure produced by said fuel pump, whereby said second piston is dependent upon the pressure difference between said fuel nozzle and the opening in said blower and independent upon said fuel pump pressure, a recess in said upper head part for transmitting the fuel from said fuel pump to said nozzle and controlling the amount of fuel fed to said fuel nozzle in accordance with the position of said upper head part, a balance beam having two arms, a fulcrum for supporting said balance beam, each of said arms being connected with one of said two pistons, whereby the amount of fuel fed to said nozzle is dependent upon said air pressure difference and upon the difference of pressure inside and outside of said fuel nozzle, the fulcrum of said balance beam being shiftable to change at will the mixing ratio of fuel to air.

3. In an internal combustion engine, a blower, an air intake connected with said blower and having a venturi, a fuel injecting nozzle in said blower, an opening in said blower adjacent said fuel nozzle for determining the pressure in said blower, a fuel conduit connected with said fuel nozzle, a fuel pump feeding fuel through said conduit to said fuel nozzle, a first piston actuated by the difference of the air pressure across said venturi in said air intake, a cylinder, a second piston slidable in said cylinder and having an upper head part a lower head part and a middle portion of reduced diameter arranged between said two head parts, said upper head part being connected with said fuel conduit and actuated by the pressure prevailing in said fuel nozzle, said lower head part being exposed to the pressure prevailing in said opening, said reduced middle portion being connected with and exposed to the pressure produced by said fuel pump, whereby said second piston is dependent upon the pressure difference between said fuel nozzle and the opening in said blower and independent upon said fuel pump pressure, a recess in said upper head part for transmitting the fuel from said fuel pump to said nozzle and controlling the amount of fuel fed to said fuel nozzle in accordance with the position of said upper head part, a balance beam having two arms, a fulcrum for supporting said balance beam, each of said arms being connected with one of said two pistons, a bellows responsive to the ambient air pressure and operatively connected with the fulcrum of said balance beam for controlling the position thereof in dependence upon the ambient air pressure.

4. In an internal combustion engine, a blower, an air intake connected with said blower and having a venturi, a fuel injecting nozzle in said blower, an opening in said blower adjacent said fuel nozzle for determining the pressure in said blower, a fuel conduit connected with said fuel nozzle, a fuel pump feeding fuel through said conduit to said fuel nozzle, a first piston actuated by the difference of the air pressure across said venturi in said air intake, a cylinder, a second piston slidable in said cylinder and having an upper head part a lower head part and a middle portion of reduced diameter arranged between said two head parts, said upper head part being connected with said fuel condit and actuated by the pressure prevailing in said fuel nozzle, said lower head part being exposed to the pressure prevailing in said opening, said reduced middle portion being connected with and exposed to the pressure produced by said fuel pump, whereby said second piston is dependent upon the pressure difference between said fuel nozzle and the opening in said blower and independent upon said fuel pump pressure, a recess in said upper head part for transmitting the fuel from said fuel pump to said nozzle and controlling the amount of fuel fed to said fuel nozzle in accordance with the position of said upper head part, a balance beam having two arms, a fulcrum for supporting said balance beam, each of said arms being connected with one of said two pistons, a bellows responsive to the ambient air pressure and operatively connected with the fulcrum of said balance beam for controlling the position thereof in dependence upon the ambient air pressure and further means for shifting the fulcrum of said balance beam to change at will the mixing ratio of fuel to air.

5. In an internal combustion engine, a blower, an air intake connected with said blower and comprising a Venturi throat, a fuel nozzle in said blower, an opening in said blower adjacent said fuel nozzle for determining the pressure of said blower, a fuel conduit connected with said fuel nozzle, a fuel pump for feeding fuel through said conduit to said fuel nozzle, a first piston actuated by the difference of the air pressure across said Venturi throat, a cylinder, a second piston slidable in said cylinder and having an upper head part a lower head part and a middle portion of reduced diameter, said upper head part being connected with said fuel conduit and exposed to the pressure prevailing in said fuel nozzle, said lower head part being exposed to the pressure prevailing in the opening in said blower, said reduced middle portion being connected with and exposed to the pressure produced by said fuel pump, whereby said second piston is dependent upon the pressure difference between said fuel nozzle and said opening and independent from said fuel pump pressure, a recess in said upper head part connecting said fuel pump with said nozzle and controlling the amount of fuel fed to said fuel nozzle in accordance with the position of said upper head part, said fuel pump being provided with an overflow valve, means for controlling said overflow valve in dependence upon the pressure in said fuel nozzle, a balance beam having two arms, a fulcrum for supporting said balance beam, each of said arms being connected with one of said two pistons, whereby the amount of fuel fed to said nozzle is controlled in dependence upon the air pressure difference in said Venturi throat and the difference of the pressure in said fuel nozzle and in said blower opening.

FRITZ GOSSLAU.
JOHANNES SCHMIDT.
GEORG WEICHE.